(12) United States Patent  
Lakdawala et al.

(10) Patent No.: US 7,421,852 B2  
(45) Date of Patent: Sep. 9, 2008

(54) MEDIA SAMPLING DEVICE

(75) Inventors: Ness Lakdawala, St-Lambert (CA); Bhuvan Pant, Roxboro (CA); Brian Monk, St-Laurent (CA)

(73) Assignee: Dectron, Montreal (CA)

( * ) Notice: Subject to any disclaimer, the term of this patent is extended or adjusted under 35 U.S.C. 154(b) by 269 days.

(21) Appl. No.: 11/450,185

(22) Filed: Jun. 12, 2006

(65) Prior Publication Data

US 2007/0283770 A1 Dec. 13, 2007

(51) Int. Cl.
*F24F 11/02* (2006.01)
*F24F 13/28* (2006.01)
*G01N 1/22* (2006.01)

(52) U.S. Cl. .............. 62/331; 62/125; 62/317; 73/863.12; 73/863.25

(58) Field of Classification Search .............. 62/125, 62/317, 331; 73/863.12, 863.23–863.25
See application file for complete search history.

(56) References Cited

U.S. PATENT DOCUMENTS

| | | | | |
|---|---|---|---|---|
| 3,411,273 A | * | 11/1968 | Duncan et al. | ............... 96/129 |
| 3,710,588 A | * | 1/1973 | Martinez | .................... 62/317 |
| 4,386,534 A | * | 6/1983 | Englund et al. | ....... 73/863.12 X |
| 4,963,167 A | | 10/1990 | Young | |
| 5,454,274 A | * | 10/1995 | Zhu | ...................... 73/863.12 |
| 6,228,155 B1 | * | 5/2001 | Tai | .............................. 96/413 |
| 6,672,134 B2 | * | 1/2004 | Bodnar | ................ 73/863.23 X |
| 6,837,118 B2 | * | 1/2005 | Bonne et al. | ............. 73/863.12 |
| 6,898,960 B1 | | 5/2005 | Bodnar | |

FOREIGN PATENT DOCUMENTS

| GB | 2238003 A | * | 5/1991 | ................. 435/7.1 |
|---|---|---|---|---|
| JP | 05212230 A | * | 8/1993 | ............. 73/863.23 |
| JP | 2003202129 A | * | 7/2003 | |

* cited by examiner

*Primary Examiner*—Thomas P Noland

(57) ABSTRACT

A monitoring device for use in monitoring the life of a filter used in the operating unit of an air conditioning system. The monitoring device has a support for use in attaching the device to the housing of the operational unit in the air conditioning system, the unit having a least one air conditioning filter holding filter material. At least one tubular arm attached to the support, each arm having an air inlet and an air outlet. The support is mounted in a manner to have a portion of the air passing through the air conditioning unit pass through the arm on the support as well. A sample filter is provided along with mounting means for removably mounting the sample filter on the arm to have air passing through the arm also pass through the sample filter. The sample filter holds the same filter material as the air conditioning filter.

14 Claims, 1 Drawing Sheet

MEDIA SAMPLING DEVICE

BACKGROUND OF THE INVENTION

1. Field of the Invention

This invention relates to a monitoring device for checking the efficiency of filter material in an air conditioning system. The invention is also directed toward an air conditioning unit using the monitoring device.

2. Description of the Related Art

Air conditioning systems normally employ one or more filters in an air conditioning unit to filter contaminants out of the air being circulated through the system. The filters are often of the type filled with filtering material and in large air conditioning systems the filters are usually quite large, quite heavy and awkward to handle. Presently, to find out if the filtering material in the filters needs replacement, the filters must be manually removed from the air conditioning unit and opened up to check if the filter material in the filters still has capacity to remove contaminants from the air passing through the filter. The removal, checking, and replacement of the filters is expensive and time consuming.

SUMMARY OF THE INVENTION

It is the purpose of the present invention to provide a monitoring device for providing a simpler way to check if the filtering material in the filters needs replacing without having to handle the filters themselves.

The monitoring device of the present invention has a small removable sample filter holding a sample of the same filtering material as is used in the air conditioning filter. The sample filter is removably mounted on a support within the air conditioning unit within the air conditioning system and in a position to be easily accessible. The sample filter can be easily removed from the support and the air conditioning unit and the sample filtering material tested to determine the amount of filtering life still left in the sample. the amount of filtering life left in the sample will give an indication of the filtering life still left in the air conditioning filter.

The sample filter is preferably designed to hold a thickness of the filtering material that is same as the thickness of the filtering material in the air conditioning filter. The monitoring device preferably has several sample filters so that when one is removed and it is found that the air conditioning filter still has filtering life left, a second sample filter can be removed some time later to check if the filtering life of the material in the air conditioning filter is finally used up. New sample filters can be installed on the support when the air conditioning filter itself is changed. The job of checking the operation and functionality of large air conditioning filters is made much easier and simpler when using the sample filters.

The invention is particularly directed toward a monitoring device for an air conditioning system having an air conditioning unit with filters of the type containing filtering material. The monitoring device is used to provide an indication of the life expectancy of the material in the filters. The monitoring device has a support that carries a least one removable sample filter, the monitoring device adapted to be mounted in an accessible position in the air conditioning unit. The removable sample filter carries the same filtering material as used in the air conditioning filter.

The invention is further particularly directed toward an air conditioning unit having a housing with an air entrance and an air exit, a fan for moving air through the housing and at least one air conditioning filter unit mounted within the housing, the filter unit holding filtering material. The unit has a monitoring device having a support, the support mounted onto the housing of the air conditioning unit and located within the unit but accessible from outside the unit. The support carries at least one tubular arm having an air inlet and an air outlet, the support locating the arm within the path of the airflow through the unit. The arm carries a sampling filter. Mounting means are provided for removably mounting the sampling filter on the arm, the sampling filter carrying the same filtering material as the air conditioning filter.

BRIEF DESCRIPTION OF THE DRAWINGS

The invention will now been described in detail having reference to the accompanying drawings in which.

DESCRIPTION OF THE PREFERRED EMBODIMENT

Figure 1:
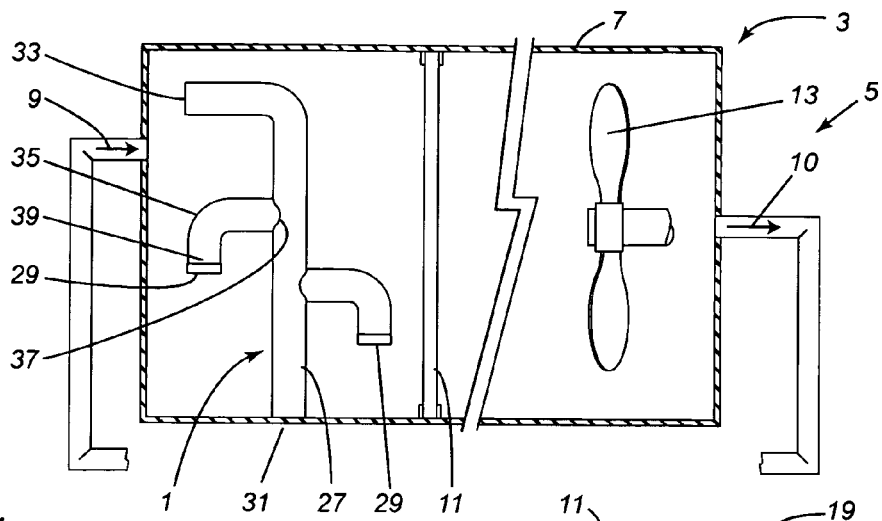
FIG. 1 is a schematic cross-section view showing the monitoring device mounted in an air conditioning unit.

The monitoring device 1 of the present invention, as shown in FIG. 1, is adapted to be mounted in the operating unit 3 of an air conditioning system 5. The operating unit 3 has a housing 7 with an air entrance 9 and an air exit 10 shown schematically. The monitoring device 1 is mounted in a position where it is easily accessible within the housing 7 through the air entrance 9 or through opening(s) in the housing which are not shown. The operating unit 3 has at least one air conditioning filter 11 filled with filtering material and usually located close to the entrance 9. A fan 13 is in the unit 3 for drawing air through the unit including past the monitoring device 1 and through the air conditioning filter 11. The operating unit 3 can have additional means for removing moisture from the air and for heating/cooling the air if it is required which means are not shown.

Figure 2:
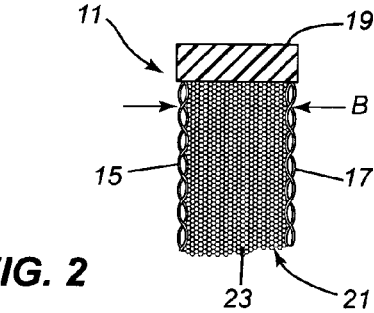
FIG. 2 is a detail cross-section view of an air conditioning filter used in the air conditioning unit.

The air conditioning filter 11, as shown in FIG. 2, is of the type holding filter material, between air permeable screens, designed to remove particular contaminants, by absorbing or otherwise capturing them, from the air passing through the screens and the material. The filter comprises two, closely spaced-apart screens 15, 17 mounted within a frame 19. The space 21 between the screens 15, 17 is filled with pellets 23, or the like, of the filter material.

The monitoring device 1 has a support 27 that carries at least one, and preferably several, sample filters 29. The support 27 is a tubular member fixed at one end 31 to the housing 7 of the air conditioning unit 3, preferably to the floor of the housing and extending vertically up into the air stream passing through the housing. The support 27 is bent to place its other free end 33 in and facing the air stream flowing through the air conditioning unit 3. One or more tubular arms 35 branch off from the support 27 to hold the sample filters 29. One end of each tubular arm 35 forms an air inlet 37 and the other end forms an air outlet 39. The arm 35 is attached at its inlet end 37 to the support 27 and a sample filter 29 is removably attached to its outlet end 39. Each arm 35 conducts air from the support 27 through the arm and through the sample filter 29 on the end of the arm 35. The arms 35 are shown to be bent through ninety degrees but could be straight as well.

Figure 3:
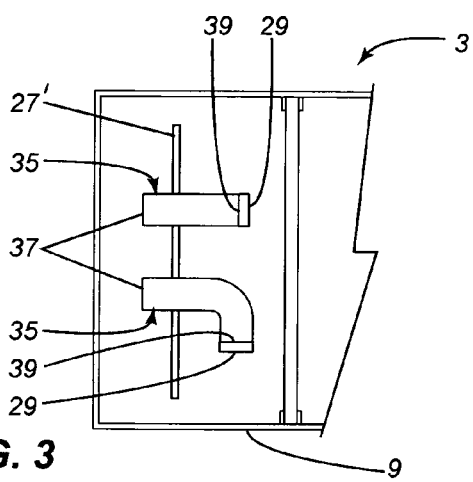
FIG. 3 is a partial schematic cross-section view showing a modified monitoring device mounted in an air conditioning unit.

While one form of support 27 for the arms has been described, other types of supports could be used. For example, the support could merely comprise a slender post 27' mounted within the air conditioning unit 3, as shown in FIG. 3, the post 27' extending up from the floor of the housing 7 of the unit 3. The arms 35 are mounted directly on the post intermediate their ends 37, 39. The arms 35 would be mounted to have the inlet end 37 facing the air flow through the unit. A sample filter 29 would be detachably mounted on the outlet end 39 of each arm, the outlet end 39 facing down if the arm is bent or facing away from the air flow if the arm is straight.

Figure 4:
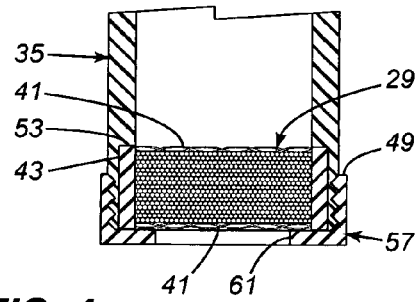
FIG. 4 is a detail, cross-section view of the end of an arm in the monitoring device mounting one of the sampling filters.
Figure 5:
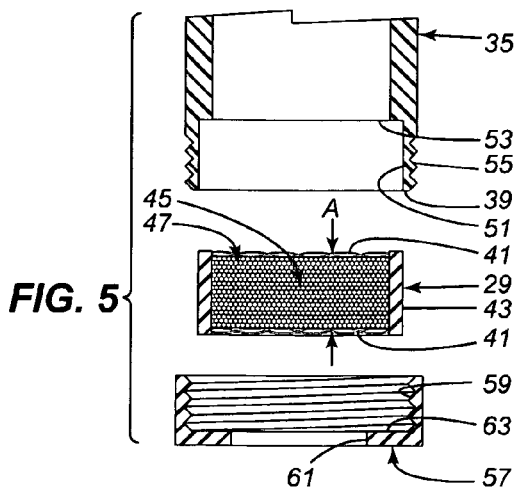
FIG. 5 is an exploded, cross-section view of the elements shown assembled in FIG. 4.

The sample filter 29, as shown in FIGS. 4 and 5, comprises a pair of closely spaced apart screens 41 held by a frame 43 and defining a holding space 45 between them. The space 45 is filled with filtering material 47 which is the same as the filtering material used in the air conditioning filter 5. Preferably the width 'A' of the space 45 is the same as the width 'B' of the space 21 in the air conditioning filter.

Mounting means 49 are provided to removably mount the sample filter 29 on the outlet end 39 of an arm 35 on the support 27. Each arm 35 has a counter bore 51 extending inwardly from the outlet end 39 to define a stop shoulder 53 against which the sample filter 29 can abut when placed within the arm 35 through the outlet end 39. The outlet end 39 is threaded on the outside as shown at 55. A cap 57, threaded on the inside as shown at 59, closes the outlet end 39 of the arm 35 and retains the sample filter 29 within the arm. The end of the cap 57 is open as shown at 61. A small annular flange 63 on the end of the cap 57 retains the sample filter 29 in place. The opening 61 in the cap 57 allows air to pass through the arm 35 and the sample filter 29.

Figure 6:
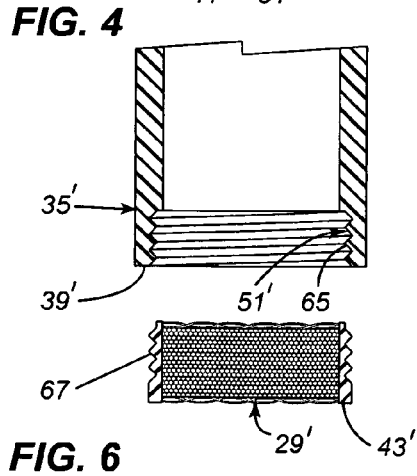
FIG. 6 is a view similar to FIG. 5 showing a modified mounting means.

While one form of mounting means 49 for the sample filter 29 has been shown, other mounting means can be used. For example the counter bore 51' in the outlet end 39' of the arm 35' can be threaded as shown at 65 in FIG. 6 instead of the outer surface of the arm at the outlet end as previously shown in FIG. 5. The outside of the frame 43' of the sample filter 29' can also be threaded, as shown at 67 and the sample filter 29' can be removably mounted within the arm 35' by simply screwing it within the outlet end 39' of the arm. No cap is needed.

In operation, when a new air conditioning filter 11 is installed in the air conditioning operating unit 3, at least one, and preferably several sample filters 29, with the same filtering material as in the air conditioning filter 11 are also installed on the ends of the arms 35 on the support 27. After the air conditioning filter 11 has been in operation for some time, a time period approaching the calculated life of the filter material within the air conditioning filter, a sample filter 29 is removed and sent to a lab to check the remaining life of its filter material. If the life of the sample filter material is exhausted, then so is the life of the air conditioning filter material and it is time to change the air conditioning filter.

If, on the other hand, there is still, for example, 20% filtering life left in the sample filter material, then the air conditioning filter 11 can still be used. If only a single sample filter is used, the air conditioning filter is used for a time equal to about a quarter of the time the sample filter was in use. If several sample filters are used, a second sample filter will be removed and tested after the unit has run for about the quarter of the time before the first sample was removed and tested. If the filtering life of the second sample is used up then the life of the air conditioning filter material would also be used up. If there is still some filtering life left in the second sample filter, the air conditioning filter could still be used for a brief period of time. Preferably several sample filters are mounted on the support at the same time as a new air conditioning filter is mounted in the air conditioning unit. The sample filters can be removed one at a time at intervals to check the progress of the air conditioning filter toward depletion of its filtering life and thus eventually signaling when the filter material in the air conditioning filter should be changed.

The sample filters make it much easier to check the life of the air conditioning filters since they are easily removable during operation of the air conditioning unit as compared to the job involved in having to remove the air conditioning filters. In addition, it is a simple matter to send the whole sample filter to a lab for testing as compared with either having to send an entire air conditioning filter to the lab or to remove the filter material from the air conditioning filter and then send it to a lab.

We claim:

1. A monitoring device having a support for use in attaching the device to the housing of an operational unit in an air conditioning system which unit has a least one air conditioning filter holding filter material; at least one tubular arm attached to the support, each arm having an air inlet and an air outlet, the support mounted in a manner to have a portion of the air passing through the air conditioning unit pass through the arm as well; a sample filter; mounting means for removably mounting the sample filter on the arm to have air passing through the arm also pass through the sample filter; the sample filter holding the same filter material as the air conditioning filter.

2. A monitoring device as claimed in claim 1 wherein the sample filter holds the filter material in a space having the same width, in a direction parallel to the air flow through it, as the width of the space in the air conditioning filter holding the filter material.

3. A monitoring device as claimed in claim 2 wherein the mounting means has a counterbore into the arm from the outlet end to form a stop shoulder within the arm, the outside of the outlet end of the arm threaded, and a cap internally threaded to threadably fit over the outlet end and to hold the sample filter within the arm between the stop shoulder and the cap, the cap having a central opening allowing air to pass through the arm and filter.

4. A monitoring device as claimed in claim 1 wherein the support is a tubular member arranged to have an air inlet facing the air flow through the air conditioning unit when mounted therein, each arm connected at its inlet end to the member to have air flow from the member through the arm and the sample filter carried by it.

5. A monitoring device as claimed in claim 4 wherein the sample filter holds the filter material in a space having the same width, in a direction parallel to the air flow through it, as the width of the space in the air conditioning filter holding the filter material.

6. A monitoring device as claimed in claim 5 wherein the mounting means has a counterbore into the arm from the outlet end to form a stop shoulder within the arm, the outside of the outlet end of the arm threaded, and a cap internally threaded to threadably fit over the outlet end and to hold the sample filter within the arm between the stop shoulder and the cap, the cap having a central opening allowing air to pass through the arm and filter.

7. A monitoring device as claimed in claim 4 wherein the mounting means has a counterbore into the arm from the outlet end to form a stop shoulder within the arm, the outside of the outlet end of the arm threaded, and a cap internally threaded to threadably fit over the outlet end and to hold the sample filter within the arm between the stop shoulder and the cap, the cap having a central opening allowing air to pass through the arm and filter.

8. A monitoring device as claimed in claim 1 wherein the mounting means has a counterbore into the arm from the outlet end to form a stop shoulder within the arm, the outside of the outlet end of the arm threaded, and a cap internally threaded to threadably fit over the outlet end and to hold the sample filter within the arm between the stop shoulder and the cap, the cap having a central opening allowing air to pass through the arm and filter.

9. An air conditioning unit having a housing with an air entrance and an air exit, a fan for moving air through the housing, at least one air conditioning filter unit mounted within the housing, the filter unit holding filtering material; a monitoring device having a support, the support mounted onto the housing of the air conditioning unit and located within the unit but accessible from outside the unit, the support carrying at least one tubular arm having an air inlet and an air outlet, the support locating the arm within the path of the airflow through the unit, the arm carrying a sampling filter, mounting means for removably mounting the sampling filter on the arm, the sampling filter carrying the same filtering material as the air conditioning filter.

10. An air conditioning unit as claimed in claim 9 wherein the sample filter holds the filter material in a space having the same width, in a direction parallel to the air flow through it, as the width of the space in the air conditioning filter holding the filter material.

11. An air conditioning unit as claimed in claim 10 wherein the mounting means has a counterbore into the arm from the outlet end to form a stop shoulder within the arm, the outside of the outlet end of the arm threaded, and a cap internally threaded to threadably fit over the outlet end and to hold the sample filter within the arm between the stop shoulder and the cap, the cap having a central opening allowing air to pass through the arm and filter.

12. An air conditioning unit as claimed in claim 9 wherein the support is a tubular member arranged to have an air inlet facing the air flow through the air conditioning unit when mounted therein, each arm connected at its inlet end to the member to have air flow from the member through the arm and the sample filter carried by it.

13. An air conditioning unit as claimed in claim 12 wherein the sample filter holds the filter material in a space having the same width, in a direction parallel to the air flow through it, as the width of the space in the air conditioning filter holding the filter material.

14. An air conditioning unit as claimed in claim 9 wherein the mounting means has a counterbore into the arm from the outlet end to form a stop shoulder within the arm, the outside of the outlet end of the arm threaded, and a cap internally threaded to threadably fit over the outlet end and to hold the sample filter within the arm between the stop shoulder and the cap, the cap having a central opening allowing air to pass through the arm and filter.

* * * * *